United States Patent
Sadasivam et al.

(10) Patent No.: US 9,661,221 B2
(45) Date of Patent: May 23, 2017

(54) ALWAYS-ON CAMERA SAMPLING STRATEGIES

(71) Applicant: QUALCOMM Incorporated, San Diego, CA (US)

(72) Inventors: Shankar Sadasivam, San Diego, CA (US); Ashwin Swaminathan, San Diego, CA (US); Mahesh Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/843,201

(22) Filed: Mar. 15, 2013

(65) Prior Publication Data

US 2014/0267799 A1    Sep. 18, 2014

(51) Int. Cl.
   *H04N 5/76*    (2006.01)
   *H04N 5/232*    (2006.01)

(52) U.S. Cl.
   CPC ..... *H04N 5/23245* (2013.01); *H04N 5/23216* (2013.01)

(58) Field of Classification Search
   CPC .......... H04N 7/15; H04N 7/152; H04N 7/155; H04N 7/157
   USPC ............................... 348/231.99, 231.2, 231.3
   See application file for complete search history.

(56) References Cited

U.S. PATENT DOCUMENTS

| | | | |
|---|---|---|---|
| 6,558,050 B1 | 5/2003 | Ishibashi | |
| 8,255,724 B2 | 8/2012 | Das | |
| 8,284,250 B2 | 10/2012 | Kroepfl et al. | |
| 8,334,898 B1 | 12/2012 | Ryan et al. | |
| 8,396,766 B1 | 3/2013 | Enright et al. | |
| 9,063,574 B1* | 6/2015 | Ivanchenko | G06F 3/017 |
| 2004/0201710 A1* | 10/2004 | Uchihashi et al. | 348/211.2 |
| 2009/0051785 A1* | 2/2009 | Kamada et al. | 348/231.5 |
| 2012/0235790 A1 | 9/2012 | Zhao et al. | |
| 2012/0280917 A1 | 11/2012 | Toksvig et al. | |
| 2012/0281129 A1* | 11/2012 | Wang et al. | 348/333.01 |
| 2013/0069787 A1* | 3/2013 | Petrou | 340/573.1 |
| 2013/0324196 A1* | 12/2013 | Wang et al. | 455/574 |
| 2014/0133548 A1* | 5/2014 | Mate et al. | 375/240.02 |
| 2014/0204245 A1* | 7/2014 | Wexler et al. | 348/231.99 |
| 2015/0160461 A1* | 6/2015 | Starner | G06F 3/013 345/156 |

FOREIGN PATENT DOCUMENTS

EP    1898634 A2    3/2008

OTHER PUBLICATIONS

International Search Report and Written Opinion—PCT/US2014/020160—ISA/EPO—May 27, 2014.

* cited by examiner

*Primary Examiner* — Sinh Tran
*Assistant Examiner* — Zhenzhen Wu
(74) *Attorney, Agent, or Firm* — Kilpatrick Townsend & Stockton, LLP

(57) ABSTRACT

Embodiments of the present invention are directed toward providing intelligent sampling strategies that make efficient use of an always-on camera. To do so, embodiments can utilize sensor information to determine contextual information regarding the mobile device and/or a user of the mobile device. A sampling rate of the always-on camera can then be modulated based on the contextual information.

33 Claims, 5 Drawing Sheets

ALWAYS-ON CAMERA SAMPLING STRATEGIES

BACKGROUND

Always-on cameras are cameras that can continuously capture images at a given sampling rate or that are always available for capturing images, which can be used in various applications on a mobile device, such as life-logging, gesture identification/recognition, indoor-outdoor inference, and more. As processing and storage capabilities of mobile devices (e.g., mobile phones, tablets, head- or body-mounted cameras, head-mounted or heads-up displays, etc.) continue to increase, so too does the potential functionality of such always-on cameras. However, the power requirements of always-on cameras can be high relative to other sensors, and many images captured by always-on cameras have little or no value.

SUMMARY

Embodiments of the present invention are directed toward providing intelligent sampling strategies that make efficient use of an always-on camera. To do so, embodiments can utilize sensor information to determine contextual information regarding the mobile device, including the state of a user of the mobile device. A sampling rate of the always-on camera can then be modulated based on the contextual information.

An example method of adaptively adjusting sensor sampling of an always-on camera, according to the description, includes causing a camera communicatively coupled with a mobile device to sample at a sampling rate, determining a state of a user of the mobile device based on sensor input, and modulating the sampling rate based on the determined state of the user.

An example mobile device, according to the disclosure, includes a memory, and a processing unit coupled with the memory and configured to perform functions including causing a camera communicatively coupled with the mobile device to sample at a sampling rate, determining a state of a user of the mobile device based on sensor input, and modulating the sampling rate based on the determined state of the user.

An example apparatus, according to the disclosure, includes means for causing a camera communicatively coupled with a mobile device to sample at a sampling rate, means for determining a state of a user of the mobile device based on sensor input, and means for modulating the sampling rate based on the determined state of the user.

An example non-transitory computer-readable medium, according to the disclosure, has instructions embedded thereon for adaptively adjusting sensor sampling of an always-on camera. The instructions include computer-executable code for causing a camera communicatively coupled with a mobile device to sample at a sampling rate, determining a state of a user of the mobile device based on sensor input, and modulating the sampling rate based on the determined state of the user.

Items and/or techniques described herein may provide one or more of the following capabilities, as well as other capabilities not mentioned. Techniques can provide for increased power efficiency, which can result in longer battery life of a mobile device in which the always-on camera is disposed. Embodiments can also increase data efficiency by reducing data that may have little or no use. These and other embodiments, along with many advantages and features, are described in more detail in conjunction with the text below and attached figures.

Figure 1:
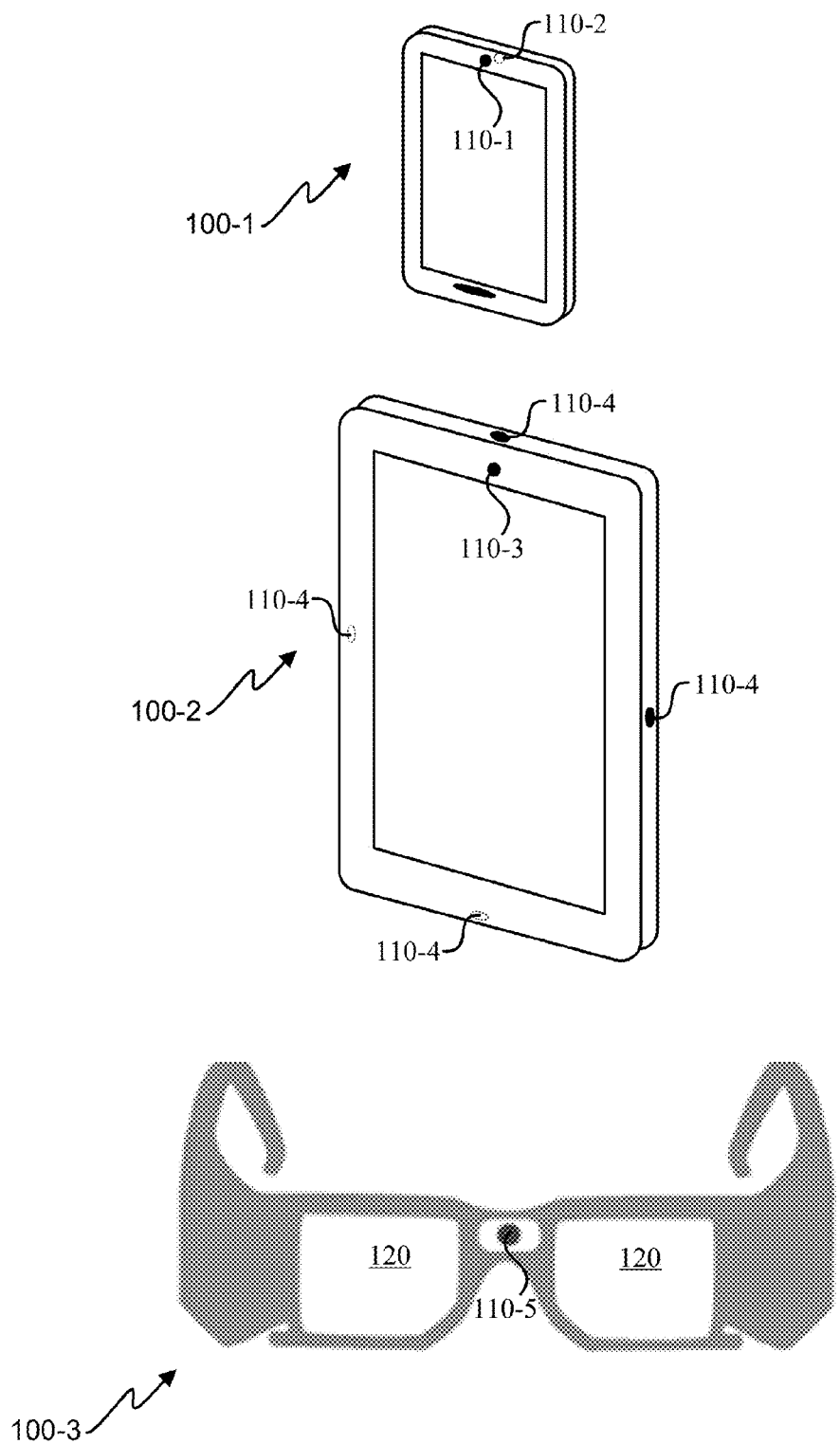
FIG. 1 is a simplified illustration of embodiments of different mobile devices that can utilize an always-on camera according to the techniques disclosed herein.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Always-on cameras in mobile devices are cameras that can provide a constant stream of images for use without requiring user initiation. As used herein, the term "always-on camera" does not literally mean the camera can never be turned off and does not literally mean that the camera is truly on all the time. Instead, the term "always-on camera" is used to describe a camera which is continuously available over an extended period of time. Such functionality can be provided as a background service of a mobile device, utilized in any of a variety of applications executable by a mobile device, such as life-logging, gesture identification/recognition, indoor-outdoor inference, and more. Although this functionality may be provided at the application layer, it may additionally or alternatively be provided at a lower level, integrated, for example, into an operating system, device drivers, and/or hardware of a mobile device. By constantly taking images, the always-on camera of a mobile device can help ensure that there is nearly always a recent camera image available for use by an application, rather than waiting for a request for a camera image before capturing an image with the camera.

One difficulty that can arise when implementing an always-on camera is its high power consumption relative to other components, which can quickly drain battery power of mobile devices. For instance, modern cameras incorporated into mobile devices such as mobile phones and portable gaming systems can consume roughly 70-80 mA per image captured. Even if this relatively high power consumption is reduced, an always-on camera could still be a high power burden on a mobile device due to the volume of images it captures. Thus, techniques described herein provide intelligent sampling strategies to increase the efficiency of an always-on camera.

An always-on camera can be included in and/or communicatively coupled with any of a variety of mobile devices. FIG. 1, for example, is a simplified illustration of embodiments of different mobile devices 100 that can utilize an always-on camera. The mobile devices 100 include a mobile phone 100-1, a tablet 100-2, and a head-mounted display (HMD) 100-3. Although not pictured in FIG. 1, other mobile devices such as personal digital assistants (PDAs), notebook computers, personal media players, gaming devices, cameras, video recorders, and the like, can also utilize the techniques disclosed herein, as well as one or more wearable devices (e.g., helmet cameras, sports cameras, etc.), which may be distributed across a user's body. Multiple devices (e.g., wearable devices) may be communicatively connected with and/or managed by a contextual determination engine, as described in further detail below, in relation to FIG. 2. Furthermore, the style, size, functionality, and/or other features of a mobile device may vary between different mobile devices of the same type. A person of ordinary skill in the art will recognize many modifications to the components illustrated.

Mobile devices 100 can include one or more cameras 110 positioned at any of a variety of locations on the mobile device 100. The mobile phone 100-1, for instance, may include a front-facing camera 110-1 and/or a rear-facing camera 110-2. The tablet 100-2 can also include a front-facing camera 110-3 and/or additional cameras 110-4 on other surfaces (e.g., sides and/or back), which may face other directions. The HMD 100-3 can have an outward-facing camera 110-5 located between the displays 120 of the HMD 100-3, as shown, and/or at another location of the HMD 100-3.

Any or all of the cameras 110 of a mobile device 100 may be utilized as an always-on camera, depending on desired functionality. Although some embodiments may utilize a particular camera dedicated for always-on functionality with particular features that can accommodate always-on functionality (e.g., a wide-angle, fisheye, low-power, low resolution, etc.), embodiments may additionally or alternatively utilize any of a variety of camera types (e.g., infrared, ultraviolet, spectrometer, high resolution, front-facing, etc.) for always-on functionality. Embodiments in which a mobile device 100 includes a plurality of cameras may choose which camera to use as an always-on camera and/or may toggle between different cameras in certain situations. Additional details regarding this functionality are provided below.

Embodiments of a mobile device 100 may vary substantially from the mobile devices shown in FIG. 1. In addition or as an alternative to cameras embedded within a mobile device 100, embodiments may include a mobile device physically separate from a camera, but communicatively coupled therewith (e.g., via wireless or wired technologies). Other sensors may also be physically separate from with a mobile device 100, yet in communication therewith, such that cameras and/or other sensors may be distributed, for example, at various locations on and/or around the body of a user.

Figure 2:
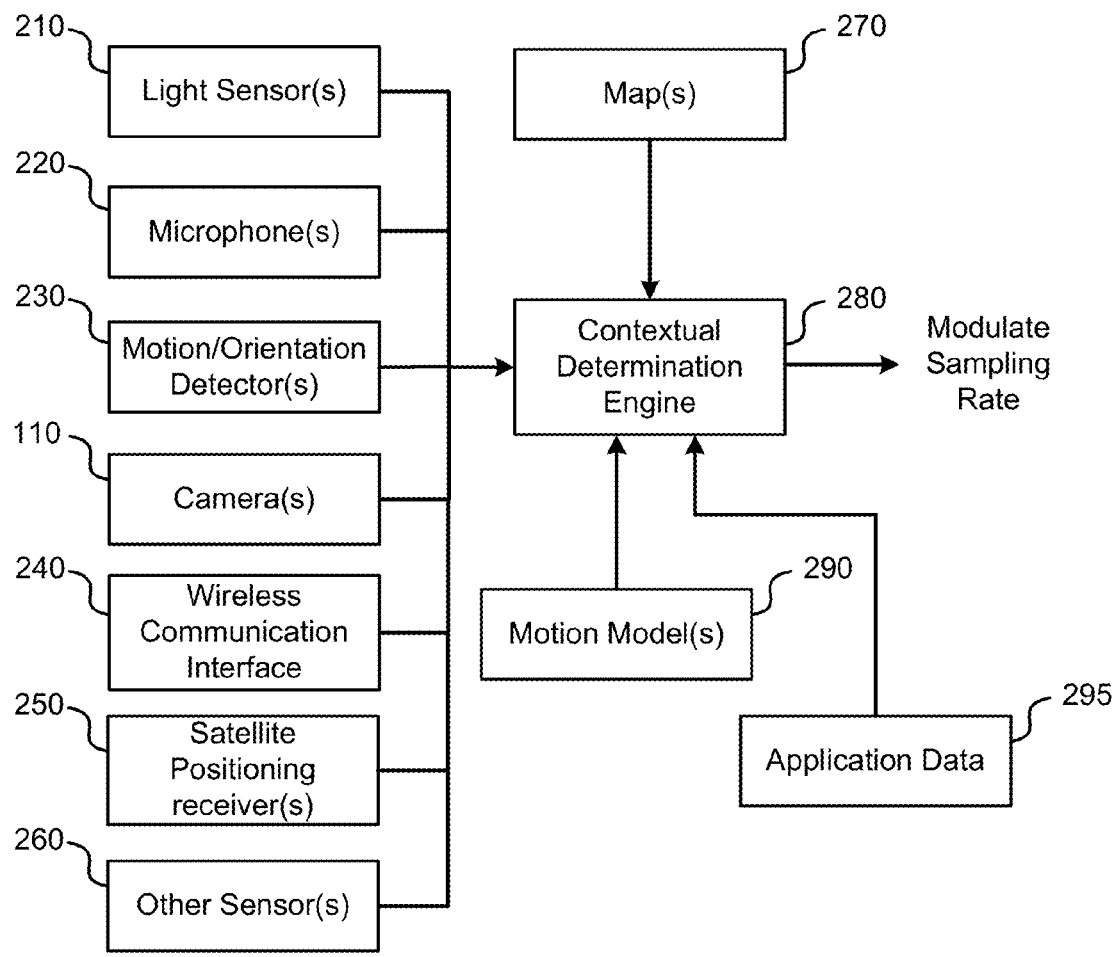
FIG. 2 is a simplified input/output diagram illustrating how embodiments of the invention can utilize sensor and other information in contextual determinations, which can influence how a sampling rate of an always-on camera may be modulated.

FIG. 2 is a simplified input/output diagram illustrating how embodiments described herein can utilize sensor and other information in contextual determinations, which can influence how a sampling rate of an always-on camera may be modulated. These contextual determinations can be made by a contextual determination engine 280 executed, for example, by software and/or hardware of the mobile device 100 (as described in further detail below with regard to FIG. 5) and/or may be part of and/or integrated into a larger software and/or hardware application of the mobile device 100. The contextual determination engine 280 can receive data from various components in order to make the contextual determination, including light sensor(s) 210 (which can include, for example, ambient light sensor(s), Ultra violet (UV) sensor(s), UV-A sensor(s), UV-B sensor(S), red-green-blue (RGB) sensor(s), and the like), microphone(s) 220, motion/orientation detector(s) 230 (which can include, for example, one or more gyroscopes, magnetometers (and/or another types of compasses), accelerometer(s), and the like), camera(s) 110, wireless communication interface 240, (which can include, for example, 2G, 3G, 4G modems, WiFi, Bluetooth, Bluetooth LE, WiMax, and the like) satellite positioning sensor(s) 250, and/or other sensor(s) 260 (e.g., altimeter(s), proximity sensor(s), compressive imaging sensor(s), temperature sensor(s), pressure sensor(s), touch sensor(s), fingerprint sensor(s), and the like). Components may also include map(s) 270, motion model(s) 290, and/or application data 295. A person of ordinary skill in the art will recognize many modifications to the components illustrated in FIG. 2. Components can be, for example, added, omitted, combined, and/or separated. Depending on desired functionality, components may be integrated into the mobile device 100 and/or separate from the mobile device 100 (communicating, for example, via a wired and/or wireless connection, as previously described).

The one or more cameras 110 can be integrated into and/or communicatively coupled with a mobile device 100. Furthermore, any or all of the camera(s) 110 can be designated as an always-on camera. The contextual determination engine 280 can make this designation. Not only may the sample rate of an always-on camera be impacted by a contextual determination of the contextual determination engine 280, but images from an always-on camera (and/or other camera(s) 110) can be processed for further contextual determinations.

Techniques herein provide for contextual determinations that can result in modulating a sampling rate of an always-on camera (which can be an initial sampling rate chosen by a software application and/or hardware default). The sampling rate can be modulated to any of a wide variety of sampling rates. For example an initial sampling rate may be one sample every 4-5 seconds. However, certain contextual determinations may cause the sampling rate to be increased to 30 samples per second (i.e., 30 frames per second (FPS)) or more. Other determinations may result in reducing the sampling rate to, for example, once every 5 minutes and/or suppressing samples altogether. Ultimately contextual determinations may result in sampling rates from zero (i.e., no sampling) to the highest rate feasible under the hardware and/or software constraints of the always-on camera. Additionally or alternatively, as described in more detail below, embodiments may provide for selectively triggering an always-on camera and/or selectively activating certain cameras in a multi-camera system based on contextual determinations.

Light sensor(s) 210 can include any of a variety of photo-sensitive sensors such as active light sensor(s), RGB sensor(s), Ultra violet (UV) sensor(s) and the like. Such light sensor(s) 210 typically consume(s) far less power than an always-on camera, and can be useful in determining the context of a mobile device 100 and/or user of the mobile device. For example, one or more light sensors 210 can be positioned to determine the light intensity to which an always-one camera is exposed. If detected light intensity is below a certain threshold, the contextual determination engine 280 may determine that an always-on camera is in a pocket or purse or in a darkened room, in which case sampling of the always-on camera can be reduced or suspended.

Some embodiments may have multiple cameras 110 that may be utilized as an always-on camera. Where lighting conditions could vary by camera location, and one or more light sensors 210 are positioned to correspond with each camera, the contextual determination engine 180 can determine which of the multiple cameras 110 to utilize as an always-on camera based on light intensity data from the light sensor(s) 210.

Additionally or alternatively, the contextual determination engine 180 may use motion/orientation detector(s) 230, motion model(s) 290, and/or light sensor(s) 210 to determine the position of a mobile device and/or always-on camera position relative to a user (such as on a desk or in the user's hand, bag, shirt pocket, pant pocket, holster, etc.), and modulate a sampling rate of the always-on camera accordingly. For example, if the mobile device is detected in a pocket, bag, purse, or holster and/or is exposed to light below a certain threshold, the view to the always-on camera is likely obstructed, and the sampling rate of the always-on camera can be reduced or stopped. In a scenario in which captured images of an always-on camera are used by a life-logging application used to automatically collect a photo log of a user's life, this functionality could result in avoiding unnecessary image capture and significant power savings when the photos provide little or no useful information, such as during night time, when the always-on camera is pocket, bag, and so forth. Motion/orientation detector(s) 230 and/or motion model(s) 290 may also enable the contextual determination engine 280 to determine a state of a user who is carrying and/or associated with the mobile device 100. The determinable user states may vary based on desired functionality. Examples include walking, running, exercising, in transit, and other such activities that may involve detectable movement and/or orientation. Furthermore, the user state can impact how an always-on camera is modulated. For example, an always-on camera may be configured to increase a sampling rate where the user state is indicative of movement outdoors (e.g., where a user's environment is likely to frequently change). On the other hand, a user state indicative of a relatively inactive state indoors may cause the contextual determination engine 280 to reduce the sampling frequency of an always-on camera.

A contextual determination engine 280 can also utilize data from the microphone (s) 220 to detect certain audio activity and direction. This can be used to determine a particular activity is going on (e.g., a meeting or conversation). This can be used to modulate a sampling frequency of an always-on camera, increasing the sampling, for example, when sound is detected.

Embodiments in which a mobile device can utilize any of multiple cameras 110 as an always-on camera, audio directionality derived from microphone data can be used to determine which direction a sound is coming from. A corresponding camera likely facing the direction of the sound may then be designated as the always-on camera to capture images based on the direction of current audio activity, which is also likely to hold informative visual information such as a speaker identity, emotions, expressions, visual scene corresponding to audio activity, and the like. The microphone(s) 220 can include one or more low-power microphone activity detectors to determine audio directionality.

This functionality can be used, for example, in a scenario in which a mobile device 100 with multiple cameras 110 is executing a life-logging application. In a meeting context, a user can place the mobile device 100 on a table, at which point the contextual determination engine 280 may use microphone(s) 220 and/or other components to determine a user state (e.g., "in a meeting"), and leverage audio directionality information of the microphones(s) 220 to determine which camera 110 to sample from and/or how to modulate (e.g., increase or decrease) a camera's sampling rate, based on the user state. When a user is working in his or her office, the contextual determination engine can utilize audio data (e.g., using audio environment clustering and/or other audio analysis techniques) to determine this user state (e.g., "working in office"), and reduce the sampling rate or turn off an always-on camera, based on the user state, until a change in audio ambience is observed.

The contextual determination engine 280 can also use data from motion/orientation detector(s) 230 to determine contextual information, such as an activity in which the user may be engaged (e.g., walking, running, in transit, etc.). Data from the motion/orientation detector(s) 230 can be compared against motion model(s) 290, which can model different activities and/or other states of a user, to make the determination. If, for example, sensed motion is within a threshold likeness of modeled motion of a certain activity, the contextual determination engine 280 may determine that the user is engaged in that activity. In some embodiments, data can be processed by a classifier such as an absolute motion classifier or a relative or full motion classifier, or may be processed by a pedometer module or function.

The contextual determination engine 280 can modulate the sampling rate of an always-on camera based on a speed, motion, and/or determined context of a user (e.g., a user state) and/or mobile device 100. For example, if the contextual determination engine 280 determines that a user is engaged in certain activities that involve a relatively high amount of movement, such as running or jumping. Thus, the contextual determination engine 280 can reduce or suspend sampling from the always-on camera.

Similarly, the contextual determination engine 280 can determine that a user is traveling at a certain speed by estimating the speed from motion/orientation detector(s) 230 and/or location information (which can be determined using, for example, the satellite positioning receiver(s) 250, a wireless communication interface 240 capable of providing positioning and/or speed information, and the like). If the speed is above a certain threshold, the contextual determination engine 280 can reduce or suspend sampling from the always-on camera to reduce the likelihood of capturing blurred images. Additionally or alternatively, speed may be used in a determination of a user state, which may then be used to determine how sampling of the always-on camera can be modulated.

The contextual determination engine 280 can also use orientation information from the motion/orientation detector(s) 230 to determine whether to modulate the sampling rate of an always-on camera and/or designate a camera for always-on functionality based on sensed orientation and/or motion when combined with one or more other components. For example, the contextual determination engine 280 may suppress image capture of an always-on camera if the previous image taken by the always-on camera is determined to be uninformative for a certain use-case (e.g., pointing towards the sky or ceiling), and the mobile device 100 and/or always-on camera has been at absolute rest since then.

Figure 3:
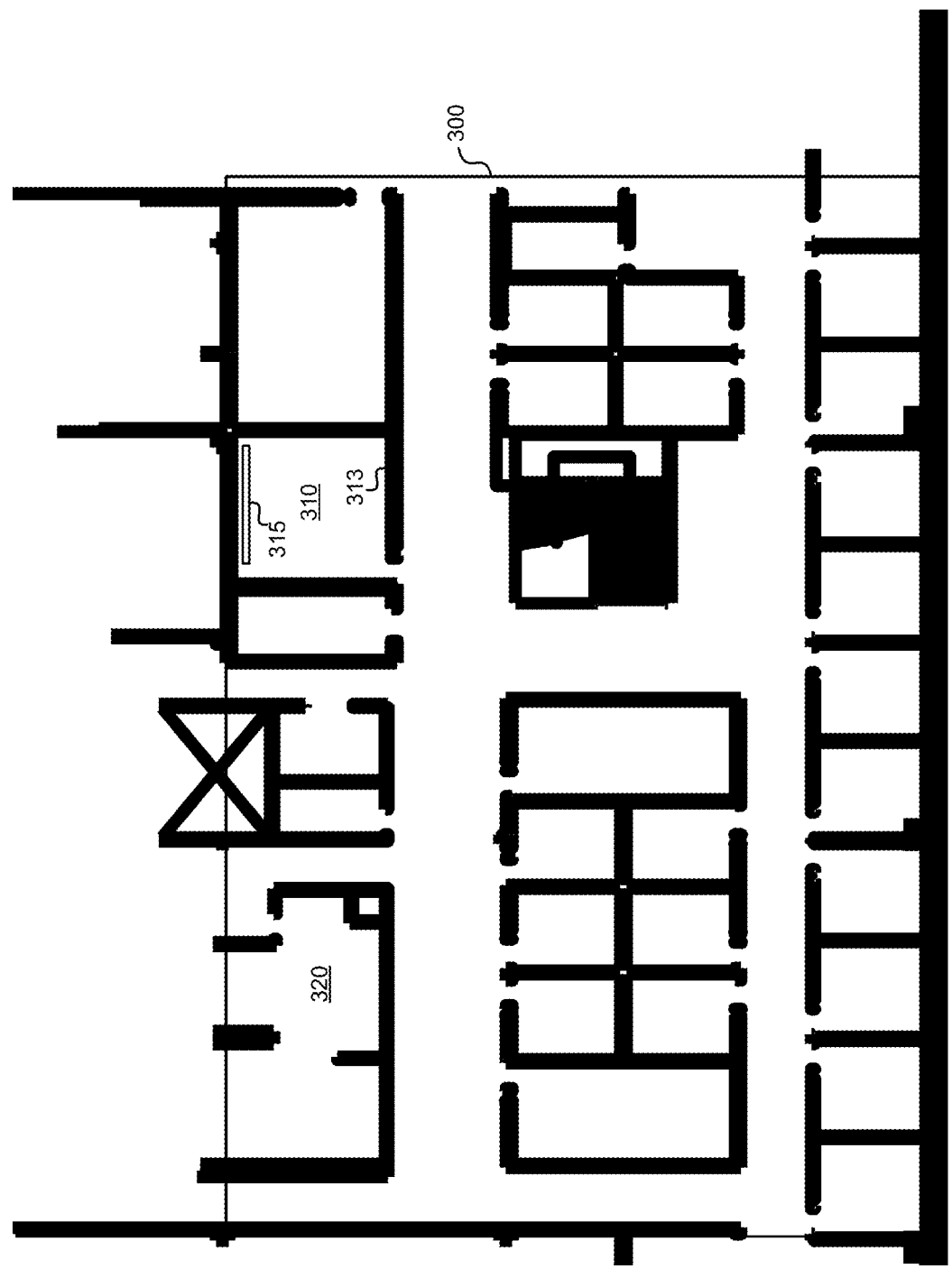
FIG. 3 is an illustration of a portion of a building map that can be used for geo-fencing, place of relevance (POR)-based triggering, and other functions, in some embodiments.

Geo-fencing and place of relevance (POR)-based triggers can also be used in contextual determinations that may impact the sampling rate of an always-on camera. FIG. 3 is an illustration of a portion of a building map 300 that can be used for geo-fencing and/or POR-based triggering. In some embodiments, the building map 300 may be provided by a building server for indoor positioning and/or other purposes. Optionally, a mobile device 100 may download a map from a data communication network, such as the internet. The building map 300 and/or other maps may be included in the map(s) 270 illustrated in FIG. 2, which may be at least partially stored in a memory of the mobile device. It will be understood that the building map 300 is provided as a non-limiting example. Geo-fencing and/or POR functionality described herein can utilize any of a variety of map types besides building maps.

For an embodiment utilizing a building map for geo-fencing, sensor data from satellite positioning sensor(s) 260, motion/orientation detector(s) 230, and/or other sensor data may be used, in conjunction the building map 300, by the contextual determination engine 280 to determine that a user is at a certain location, which may impact whether to increase or decrease the sampling rate of an always-on camera. Certain locations of the map 300 may be "tagged" (i.e., associated with) information indicative of a user activity or other contextual information, which can impact the frequency at which an always-on camera is sampled. For example, a restroom 320 and/or conference room 310 may be tagged as such, enabling the contextual determination engine 280 to infer certain user activities when a mobile device is determined to be located in either of these locations. Other such special-purpose locations can also be tagged to imply certain user activity (e.g., cafeteria, theater, garage, bedroom, elevator, etc.).

Some locations may clearly require a relatively high or relatively low sampling rate for an always-on camera. For example, the sampling rate may be reduced/suspended in a bathroom, bedroom, high-security area, and/or other location in which image capture may be prohibited or discouraged. On the other hand, the sampling rate of an always-on camera may be increased for certain PORs, such as theme parks and/or other locations in which a user and/or application may want a relatively high rate of image capture. Depending on desired functionality, a user may be able to define the boundaries of the PORs and/or tag certain PORs with information that may impact a chosen sampling rate. In some embodiments, the contextual determination engine 280 may maintain and/or access privacy settings that may inhibit or prevent an always on camera from taking pictures.

In some embodiments, these settings may be created by the user. Embodiments may also cause a mobile device 100 to provide an alert (e.g., using sound, vibration, an indication on a display, etc.) when a user enters a private or secure area and the always-on camera will suspend image capture. A similar alert may additionally or alternatively be provided when a user exits the private or secure area, and the always-on camera will resume image capture.

Image data and/or other information from camera(s) 110, including images by an always-on camera, can be utilized by the contextual determination engine 280 to duty cycle and/or time stagger image capture of an always-on camera. Image processing techniques can be utilized on one or more images from the camera(s) 110 to detect movement, which may indicate that there is a change in the mobile device's surroundings or that a certain activity is taking place. For instance, movement can be detected from changes in successively-captured images. If, for example, the camera is facing a scene in which no movement is detected for the last two images captured, the contextual determination engine 280 may determine that the context of the mobile device 100 is static or the state of a user includes an activity in which very little change in the user's environment occurs, in which case the contextual determination engine 280 may implement an exponential back-off type duty cycling to reduce power consumption.

Additionally or alternatively, where a mobile device has multiple cameras, it may cycle through the cameras (staggering captures from each) or synchronize captures from all cameras. For example, where images from an always-on camera indicate that little or no movement is occurring within the camera's view, the contextual determination engine 280 can designate another of the cameras 110 as the always-on camera, rotating from one camera 110 of the mobile device 100 to the next until movement (and/or some other trigger) is detected. In some embodiments, a contextual determination engine may optionally synchronize the camera(s) 110 to capture images at the same or approximately the same time.

The contextual determination engine 280 may further utilize a wireless communication interface 240 to make a contextual determination that may impact the sampling rate of an always-on camera. The wireless communication interface 240 can detect the presence of wireless signals, such as near-field communication (NFC) signals, IEEE 802.11 (e.g., WiFi), Bluetooth (BT), Bluetooth Low Energy (BT-LE), and the like. A change in wireless signals can be indicative of a change in the mobile device's surroundings and/or location, including the presence and/or loss of a wireless device. By means of an example, a change in the number of Bluetooth devices in the vicinity of the device might be an indication that new devices and/or people have entered or left. Also, the frequency of the change in the number of devices could indicate the dynamism of the environment (e.g., a shopping mall may have more change compared to home). This change in wireless signals can be used as a trigger to modulate the sampling rate of an always-on camera. That is, such wireless triggers can denote that the mobile user's immediate vicinity has changed which may be cause to increase the sampling rate of an always-on camera. The wireless communication interface 240 may additionally or alternatively utilize a radio access technology (RAT) switch, for example, when a mobile device 100 switches from using one wireless technology to another, to determine a change in wireless signals.

The contextual determination engine 280 may further utilize application data 295 obtained from one or more applications executed by the mobile device 100, which can be indicative of the state of a user. Such data can include, without limitation, calendar information, location information, social media status updates, and more. For example, information from a calendar application may indicate that the user is in (or likely in) a meeting. Based on that determined user state, the contextual determination engine may choose to modulate a sampling rate of the camera accordingly to help ensure a proper amount of visual information is captured. Application data can vary substantially, based on application functionality.

Referring again to FIG. 3, in addition providing geo-fencing and/or POR-related information, a building map 300 (or other map type, such as a room, courtyard, etc.) can be used to determine whether what may be in the view of the always-on camera (e.g., looking at a wall, a ceiling, out a window, a stage, etc.), which can impact its sampling rate. For example, using the building map 300 along with orientation and/or location information, the contextual determination engine 280 may determine that the mobile device 100 is in a room 310 with the always-on camera facing a wall 313. Because the wall is likely contains little or no useful data, the contextual determination engine 280 may reduce in the always-on camera's sampling rate. On the other hand, if the room 310 is a conference room and the always-on camera is determined to be facing a projector screen 315, then the sampling rate may be increased. Additionally or alternatively, where multiple cameras are available, this information can be used to determine which camera(s) 110 to sample (e.g., designate as an always-on camera), sampling from the camera(s) 110 with views that are more likely to include items of interest.

The techniques and/or sensors described above can be prioritized and/or utilized in conjunction with one another, depending on the situation. For example, a microphone may be utilized with building map data to determine which camera(s) 110 to designate as always-on cameras. In another example, the contextual information determined from the light sensor(s) 210 may be prioritized over geo-fencing information such that, if the light sensor(s) 210 indicate the always-on camera (and/or mobile device 100) is in a user's pocket, the always-on camera's sampling rate will be reduced, even if the mobile device 100 is determined to be in a conference room, which would have increased the sampling rate otherwise.

Figure 4:
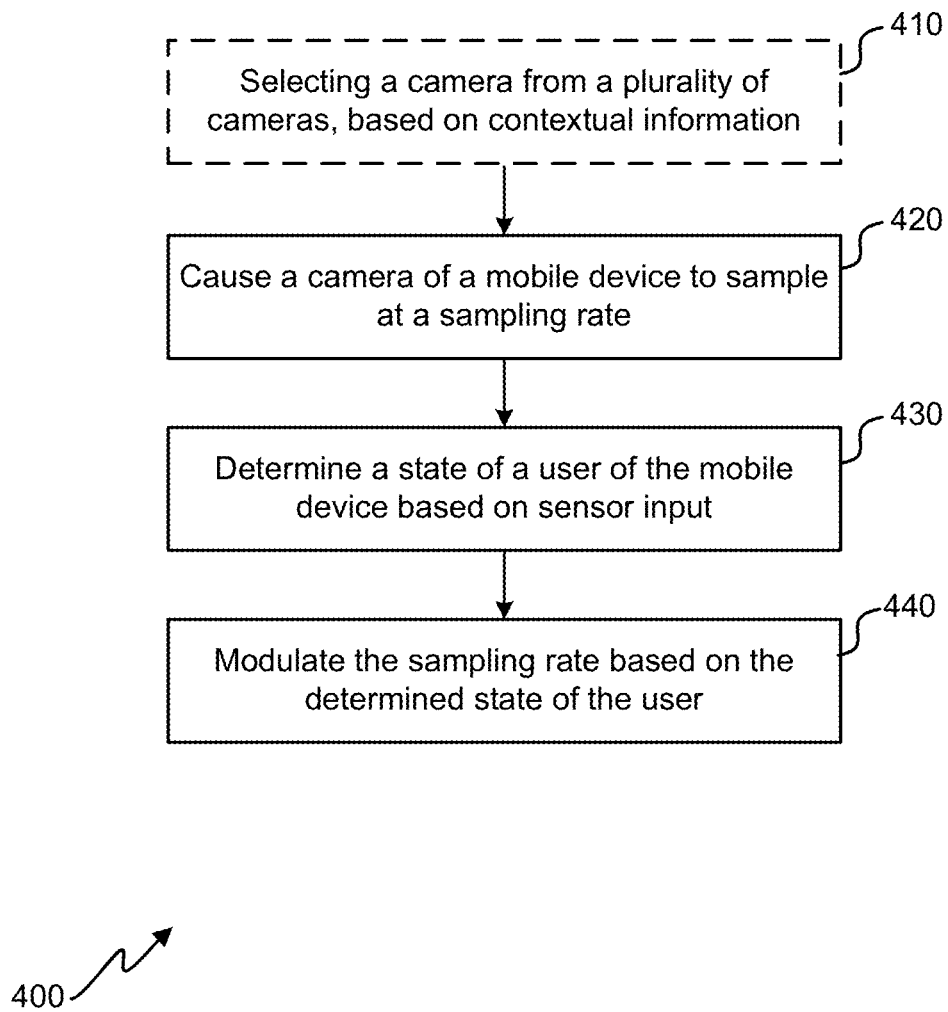
FIG. 4 is a flow chart of a process 400 for adaptively adjusting sensor sampling of an always-on camera of a mobile device, according to one embodiment.

FIG. 4 is a flow chart of a process 400 for adaptively adjusting sensor sampling of an always-on camera of a mobile device, according to one embodiment. The process 400 can be executed by various hardware and/or software components of a mobile device 100, such as a contextual determination engine 280, sensors, and/or other components illustrated in FIG. 2. In particular, means for performing the process 400 can include, for example, specialized and/or generalized hardware can be programmed and/or otherwise configured to perform all or part of the process 400 shown. Such means are described in further detail below with regard to FIG. 5.

The process 400 can optionally begin at block 410 by selecting one or more camera(s) from a plurality of cameras, based on contextual information. Such information can include, for example, maps (which can be indicative of the camera's view relative to certain mapped features), orientation and/or motion information, sound directionality, features from one or more previously-captured images, and the like. Certain cameras, such as a wide-angle or fish-eye camera, can be used as a default camera for always-on functionality if little or no contextual information is available, or if the context is not easily determinable. Means for performing the function of block 410 can include, for example, one or more processing units, sensors, and/or software (e.g., an application, operating system, etc.), which are described in further detail below in FIG. 5.

At block 420, the process 400 includes causing a camera of a mobile device to sample at a sampling rate. As described above, such always-on functionality can be a background service that is incorporated into an application executed by the mobile device, an operating system of the mobile device, a device driver, and/or physical layer of the mobile device to provide automatic image capture without user input. An initial sampling rate may be determined by user and/or application settings, camera defaults, mobile device defaults, and the like. Means for performing the function of block 410 can include, for example, one or more processing units, cameras, a wireless communication interface, and/or software, which are described in further detail below in FIG. 5.

At block 430 the state of a user of the mobile device is determined, based on sensor input. As described previously, contextual information, such as the state of a user, can be determined using input from any of a variety of sensors and/or information from other sources. As discussed above, data can be received from a camera, a motion sensor, a light sensor, an orientation sensor, a microphone, a wireless communication interface, and/or a satellite receiver.

Determining the state of a user can include determining any of a variety of contextual information about a user. This can include, for example, a position of the mobile device in relation to a user of the mobile device (e.g., in a pocket, in a purse, in a holster, in the user's hand, on a desk near the user, etc.), an activity engaged in by a user of the mobile device (e.g., in a meeting, on a telephone call, being alone, watching TV, playing, reading, writing, meeting people, looking at screen, giving a presentation, eating, shopping, cooking, attending a talk, exercising, listening to music, sleeping, etc.) a motion state of the user (e.g., stationary, walking, running, in transit, fiddling with the mobile device, etc.), a POR (place of relevance) of the mobile device (e.g., at a location that can be indicative of a state of the user, such as in a cafeteria, at a bus stop, in a conference room, etc.), a change in the mobile device's surroundings (e.g., an audio change, change in ambient light information, change in the number of devices around the user, change in the number of people around the user, etc.), and the like. Determining the state of a user additionally or alternatively may include classifying the user's environment as being one or more of a variety of predetermined states, such as in a meeting, on a telephone call, being alone, and the like. This type of environmental classification can come from information about a POR, a state of a mobile device (e.g., on a telephone call), sensor data, and/or other information. Determining a state of the user may additionally include clustering sensor input from one or more sensors. For example, if a user is working along in the office, audio environment clustering techniques can be used to determine this state of the user. Corresponding image capture by an always-on camera can be minimized or turned off until a change in audio ambience is observed. Means for performing the function of block 410 can include, for example, one or more processing units, cameras, a wireless communication interface, memory (which can be used, for example, to store motion models, maps, and/or other data), and/or software, which are described in further detail below in FIG. 5.

At block 440, the sampling rate is modulated based on the determined state of the user. Modulating an existing sampling rate can include increasing or decreasing a default or initial sampling rate. In some instances, modulating the sampling rate may also include suppressing one or more samples that would otherwise have been sampled pursuant to the default or initial rate. As indicated previously, the sampling rate may be modulated to virtually any rate the always-on camera is capable of, based on the determined state of the user. This can include, for example, suspending sampling of the always-on camera altogether, increasing image capture to video rates (e.g., 30 images per second) or higher, or selecting a sampling rate anywhere in between. Means for performing the function of block 410 can include, for example, one or more processing units, cameras, a wireless communication interface, and/or software, which are described in further detail below in FIG. 5. It can further be noted that, not only can the determined state of the user influence how a sampling rate of an always-on camera is modulated, but images from the always-on camera can be used to determine a user state. Thus, determining user state can occur both before and after image capture by the always-on camera.

It should be appreciated that the specific steps illustrated in FIG. 4 provide an example process 400 for adaptively adjusting sensor sampling of an always-on camera of a mobile device. Alternative embodiments may include alterations to the embodiments shown. Furthermore, additional features may be added or removed depending on the particular applications. For example, a second camera may be selected to be the always-on camera after determining the state of the user. In a multi-camera system, sampling may be rotated and/or synchronized between cameras, as discussed previously herein. One of ordinary skill in the art would recognize many variations, modifications, and alternatives.

Figure 5:
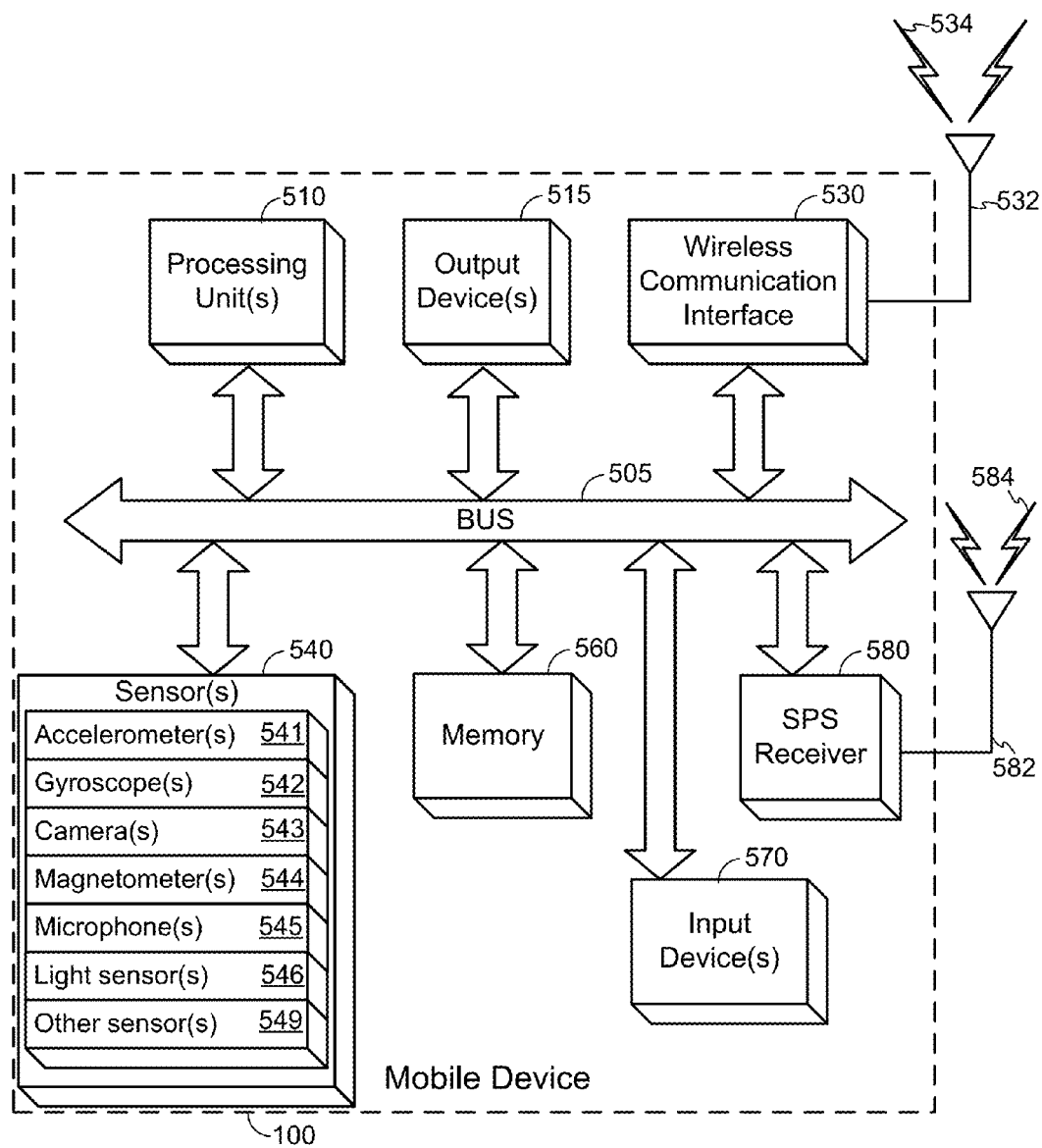
FIG. 5 illustrates an embodiment of a mobile device.

FIG. 5 illustrates an embodiment of a mobile device 100, which can include and/or be communicatively coupled with an always-on camera, as described above. The mobile device 100 also can be configured to perform the methods provided by various other embodiments, such as the process 400 illustrated in FIG. 4. It should be noted that FIG. 5 is meant only to provide a generalized illustration of various components, any or all of which may be utilized as appropriate. Furthermore, the hardware and/or software components of the mobile device 100 shown in FIG. 5 can be configured to implement one or more of the components illustrated in FIG. 2, such as the contextual determination engine 280, sensors, and more.

It can also be noted that components illustrated by FIG. 5 can be localized to a single mobile device and/or distributed among various networked devices, which may be disposed at different physical locations. For example, some embodiments may include distributed camera(s) 546 and/or other sensors 540 at various locations on or near a user's body. An always-on camera of an HMD (worn on a user's head), for instance, may be communicatively coupled with a mobile phone in the user's pocket, and components shown in FIG. 5 may be distributed among the HMD and mobile phone in any of a variety of ways, depending on desired functionality.

The mobile device 100 is shown comprising hardware elements that can be electrically coupled via a bus 505 (or may otherwise be in communication, as appropriate). The hardware elements may include processing unit(s) 510 which can include without limitation one or more general-purpose processors, one or more special-purpose processors (such as digital signal processors (DSPs), graphics acceleration processors, application specific integrated circuits (ASICs), and/or the like), and/or other processing structure or means, which can be configured to perform one or more of the methods described herein, including method of FIG. 4. The mobile device 100 also can include one or more input devices 570, which can include without limitation a touch screen, a touch pad, button(s), dial(s), switch(es), and/or the like; and one or more output devices 515, which can include without limitation a display, light emitting diode (LED), speakers, and/or the like.

The mobile device 100 might also include a wireless communication interface 530, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. Communication to and from the mobile device 100 may thus also be implemented, in some embodiments, using various wireless communication networks. These networks can include, for example, a wide area wireless network (WWAN), a wireless local area network (WLAN), a wireless personal area network (WPAN), and the like. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may implement Long Term Evolution (LTE), LTE Advanced, and so on. LTE, LTE Advanced, GSM, and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN. The wireless communication interface 530 may permit data to be exchanged directly with other sensors, systems, and/or any other electronic devices described herein. The communication can be carried out via one or more wireless communication antenna(s) 532 that send and/or receive wireless signals 534.

The wireless communication interface 530 may also be utilized to determine a location of the mobile device 100. For example, access points (including base stations and/or other systems used for wireless voice and/or data communication) can serve as independent sources of position data, e.g., through implementation of trilateration-based procedures based, for example, on RTT and/or RSSI measurements. The access points can be part of a WLAN that operates in a building to perform communications over smaller geographic regions than a WWAN. Moreover, the access points can be part of a WiFi network (802.11x), cellular piconets and/or femtocells, Bluetooth network, and the like. The access points can also form part of a Qualcomm indoor positioning system (QUIPSTM).

The mobile device 100 can further include sensor(s) 540. As indicated herein, sensor(s) 540, which can correspond to the sensors described in FIG. 2, can include sensors from which an orientation and/or motion of the mobile device 100 can be determined, such as one or more accelerometer(s) 541, gyroscope(s) 542, magnetometer(s) 544, and the like. The mobile device 100 may further include other sensor(s) 540, such as microphone(s) 565, light sensor(s) 546, proximity sensors, and more, as described previously in relation to FIG. 2. Camera(s) 543 can include any number of different cameras with different features (RGB, infrared, wide-angle, fisheye high-resolution, etc.), any or all of which can be utilized as an always-on camera as described herein.

Embodiments of the mobile device may also include a satellite positioning system (SPS) receiver 580 capable of receiving signals 584 from one or more SPS using an SPS antenna 582. The SPS receiver 580 can correspond to the satellite positioning receiver(s) 250 described in relation to FIG. 2, which can provide location information (e.g., coordinates) regarding the mobile device, as well as information derived therefrom (speed, acceleration, etc.). Transmitted satellite signals 584 may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

The mobile device 100 may further include (and/or be in communication with) a memory 560. The memory 560 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 560 of the mobile device 100 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as the process described in relation to FIG. 4, might be implemented as code and/or instructions executable by the mobile device 100 (and/or a processing unit within a mobile device 100) (and/or another device of a positioning system). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the mobile device 100) to perform methods in accordance with various embodiments of the invention. According to a set of embodiments, some or all of the procedures of such methods are performed by the mobile device 100 in response to processing unit(s) 510 executing one or more sequences of one or more instructions (which might be incorporated into an operating system and/or other code) contained in the memory 560. Merely by way of example, execution of the sequences of instructions contained in the memory 560 might cause the processing unit(s) 510 to perform one or more procedures of the methods described herein. Additionally or alternatively, portions of the methods described herein may be executed through specialized hardware.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method of adaptively adjusting sensor sampling of an always-on camera, the method comprising:
   determining, independent of user commands and using an input from one or more sensors associated with a mobile device, contextual information including an activity of a user of the mobile device or a state of the mobile device;
   selecting, independent of user commands, a first camera as the always-on camera from a plurality of cameras communicatively coupled with the mobile device, based on the determined activity of the user or the determined state of the mobile device;
   causing the selected first camera to sample at a sampling rate;
   determining, after selecting the first camera, a state of the user of the mobile device based on a sensor input from the one or more sensors; and
   modulating the sampling rate based on the determined state of the user.

2. The method of claim 1, wherein determining the contextual information comprises determining at least one of:
   a location or coordinate of the mobile device,
   a position of the mobile device in relation to the user of the mobile device,
   an activity engaged in by the user of the mobile device,
   a place of relevance of the mobile device, or
   a change in surroundings of the mobile device.

3. The method of claim 1, wherein the state of the user comprises a motion state of the user.

4. The method of claim 3, wherein the motion state comprises at least one of:
   stationary,
   walking,
   running,
   in transit, or
   fiddling with the mobile device.

5. The method of claim 1, wherein determining the state of the user comprises determining that the user is involved in at least one activity selected from the following list of activities: in a meeting, on a telephone call, being alone, watching TV, playing, reading, writing, meeting people, looking at a screen, giving a presentation, eating, shopping, cooking, attending a talk, exercising, listening to music, and sleeping.

6. The method of claim 1, wherein:
   the sampling rate comprises a default rate; and
   the modulating comprises suppressing one or more samples that would otherwise have been sampled pursuant to the default rate.

7. The method of claim 1, wherein the sensor input comprises data from at least one of:
   the first camera,
   a motion sensor,
   a light sensor,
   an orientation sensor,
   a microphone,
   a wireless communication interface, or
   a satellite receiver.

8. The method of claim 7, wherein the determining comprises clustering sensor inputs from the one or more sensors.

9. The method of claim 1, further comprising determining the state of the user based on a map of a building.

10. The method of claim 1, further comprising determining the state of the user based on information received from a calendar application executed by the mobile device.

11. A mobile device comprising:
    a memory; and
    a processing unit coupled with the memory and one or more sensors, the processing unit configured to perform functions including:
       determining, independent of user commands and using an input from the one or more sensors, contextual information including an activity of a user of the mobile device or a state of the mobile device;
       selecting, independent of user commands, a camera from a plurality of cameras communicatively coupled with the mobile device, based on the determined activity of the user or the determined state of the mobile device;
       causing the selected camera to sample at a sampling rate;
       determining, after selecting the camera, a state of the user of the mobile device based on a sensor input from the one or more sensors; and
       modulating the sampling rate based on the determined state of the user.

12. The mobile device of claim 11, wherein the processing unit is configured to determine the contextual information by determining at least one of:
    a location or coordinate of the mobile device,
    a position of the mobile device in relation to the user of the mobile device,
    an activity engaged in by the user of the mobile device,
    a place of relevance of the mobile device, or
    a change in surroundings of the mobile device.

13. The mobile device of claim 11, wherein the processing unit is configured to determine the state of the user by determining a motion state of the user.

14. The mobile device of claim 13, wherein the processing unit is configured to determine the motion state as at least one of:
    stationary,
    walking, running,
in transit, or
fiddling with the mobile device.

15. The mobile device of claim 11, wherein the processing unit is configured to determine the state of the user by determining that the user is involved in at least one activity selected from the following list of activities: in a meeting, on a telephone call, being alone, watching TV, playing, reading, writing, meeting people, looking at a screen, giving a presentation, eating, shopping, cooking, attending a talk, exercising, listening to music, and sleeping.

16. The mobile device of claim 11, wherein:
the sampling rate comprises a default rate; and
the processing unit is configured to modulate the sampling rate by suppressing one or more samples that would otherwise have been sampled pursuant to the default rate.

17. The mobile device of claim 11, further comprising at least one of:
the camera,
a motion sensor,
a light sensor,
an orientation sensor,
a microphone,
a wireless communication interface, or
a satellite receiver.

18. The mobile device of claim 17, wherein the processing unit is configured to determine the state of the user by clustering sensor inputs from the one or more sensors.

19. The mobile device of claim 11, wherein the processing unit is further configured to determine the state of the user based on a map of a building.

20. The mobile device of claim 11, wherein the processing unit is further configured to determine the state of the user based on information received from a calendar application executed by the mobile device.

21. The mobile device of claim 11, wherein the mobile device comprises a head-mounted display.

22. The mobile device of claim 11, wherein the mobile device comprises a mobile phone.

23. An apparatus comprising:
means for determining, independent of user commands and using an input from one or more sensors associated with a mobile device, contextual information including an activity of a user of the mobile device or a state of the mobile device;
means for selecting, independent of user commands, a camera from a plurality of cameras communicatively coupled with the mobile device, based on the determined activity of the user or the determined state of the mobile device;
means for causing the selected camera to sample at a sampling rate;
means for determining, after selecting the camera, a state of the user of the mobile device based on a sensor input from the one or more sensors; and
means for modulating the sampling rate based on the determined state of the user.

24. The apparatus of claim 23, wherein the means for determining the state of the user comprise means for determining at least one of:
a location or coordinate of the mobile device,
a position of the mobile device in relation to the user of the mobile device,
an activity engaged in by the user of the mobile device,
a place of relevance of the mobile device, or
a change in surroundings of the mobile device.

25. The apparatus of claim 23, wherein the means for determining the state of the user comprise means for determining a motion state of the user.

26. The apparatus of claim 25, wherein the means for determining the motion state of the user comprise means for determining that the user is at least one of:
stationary,
walking,
running,
in transit, or
fiddling with the mobile device.

27. The apparatus of claim 23, wherein the means for determining the state of the user comprise means for determining that the user is involved in at least one activity selected from the following list of activities: in a meeting, on a telephone call, being alone, watching TV, playing, reading, writing, meeting people, looking at a screen, giving a presentation, eating, shopping, cooking, attending a talk, exercising, listening to music, and sleeping.

28. The apparatus of claim 23, wherein:
the sampling rate comprises a default rate; and
the means for modulating the sampling rate comprise means for suppressing one or more samples that would otherwise have been sampled pursuant to the default rate.

29. The apparatus of claim 23, further comprising means for receiving the sensor input from at least one of:
the camera,
a motion sensor,
a light sensor,
an orientation sensor,
a microphone,
a wireless communication interface, or
a satellite receiver.

30. The apparatus of claim 29, further comprising means for clustering sensor inputs from the one or more sensors.

31. The apparatus of claim 23, further comprising means for determining the state of the user based on a map of a building.

32. The apparatus of claim 23, further comprising means for determining the state of the user based on information received from a calendar application executed by the mobile device.

33. A non-transitory computer-readable medium having instructions embedded thereon for adaptively adjusting sensor sampling of an always-on camera, the instructions including computer-executable code for:
determining, independent of user commands and using an input from one or more sensors associated with a mobile device, contextual information including an activity of a user of the mobile device or a state of the mobile device;
selecting, independent of user commands, a first camera as the always-on camera from a plurality of cameras communicatively coupled with the mobile device, based on the determined activity of the user or the determined state of the mobile device;
causing the selected first camera to sample at a sampling rate;
determining, after selecting the first camera, a state of the user of the mobile device based on a sensor input from the one or more sensors; and
modulating the sampling rate based on the determined state of the user.

* * * * *